Patented Dec. 25, 1934

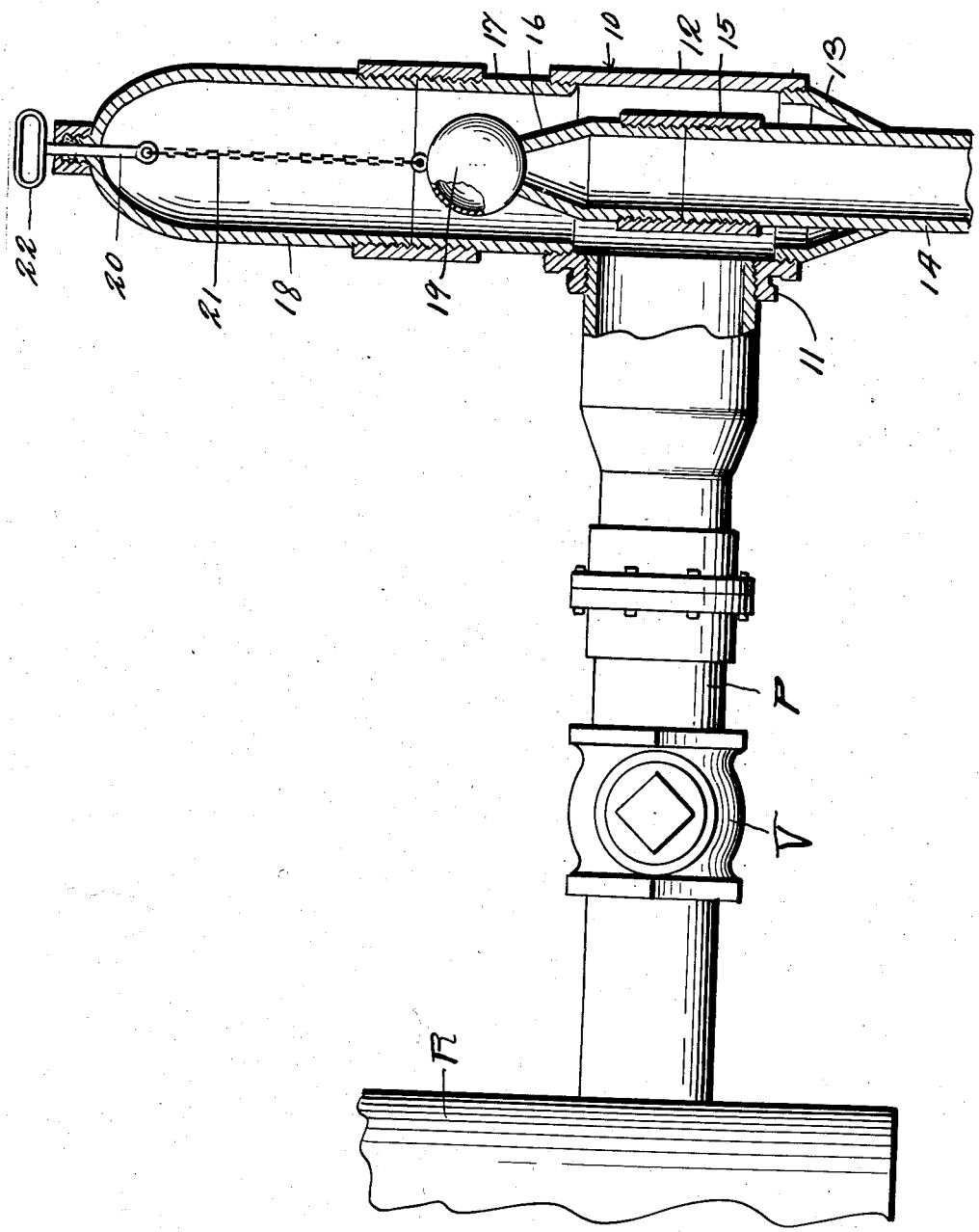

1,985,663

UNITED STATES PATENT OFFICE 1,985,663

AUTOMATIC CUT-OFF FOR FLUID LINES

Charley Lowery, Oklahoma City, Okla.

Application August 8, 1933, Serial No. 684,265

3 Claims. (Cl. 137—68)

This invention relates to fluid cut-off means and more particularly to an automatic cut-off for a fluid pipe line.

An object of this invention is to provide automatically operated means which is adapted to be connected to a fluid pipe line for automatically cutting off the flow of fluid when the pressure has been released or when the quantity of liquid has been depleted from the reservoir so as to prevent the entrance of air into the pipe line.

Another object of this invention is to provide an exceedingly simple automatic cut-off which is so constructed that in the event a partial vacuum is created in the device the automatic cut-off means can be moved into open or released position without taking the device apart or removing the device from the pipe line.

A further object of this invention is to provide an automatic cut-off which is interposed in a fluid pipe line so as to prevent the creation of a siphon when the pressure in the pipe line has been reduced.

The above and various other objects and advantages of this invention will in part be described and in part be understood from the following detailed description of the present preferred embodiment, the same being illustrated in the accompanying drawing wherein:—

The figure shows the device embodying the present invention, in operative position and in partial section.

Referring to the drawing wherein like characters of reference designate corresponding parts throughout the several views, the letter R designates generally a reservoir of desired capacity which preferably is adapted to receive a liquid of a suitable character and the letter P designates a draw-off pipe line which is connected at one end to the reservoir R. Preferably this pipe line P is connected to the reservoir R adjacent the bottom thereof and is horizontally disposed and the opposite end of the pipe line P is adapted to be connected to a suitable pump or other means for removing the liquid from the reservoir R. In order to prevent the entrance of air into the pipe line P when the reservoir R becomes substantially empty or when the liquid in the reservoir R is substantially even or slightly below the pipe line P I have provided an automatic cut-off means in the form of a T-shaped housing generally designated as 10. The housing 10 has the stem portion 11 thereof connected to the pipe line P and the top or cross bar portion 12 of the T 10 is vertically disposed.
A reducing pipe connection 13 is threaded or otherwise secured to the lower end of the cross bar T portion 12 and a pipe 14 is adapted to be connected to this reducing member 13 and in the present instance this pipe 14 extends through the reducing member 13 and into the body of the T 10.

A collar or coupling member 15 is secured to the upper end of the pipe 14 which is disposed within the T 10 and a reducing nipple or valve seat member 16 is secured to the collar or coupling member 15 and extends through the upper portion of the T 10.

A sleeve 17 is threaded into the upper portion of the T 10 and this sleeve 17 is adapted to receive a cap 18. A substantially spherical or buoyant valve 19 is disposed within the housing, comprising the cap 18 and the sleeve 17. A releasing member in the form of a rod 20 which is slidably disposed through the top of the cap 18 is connected to the valve 19 by means of a flexible member or chain 21. A handle 22 is carried by the rod 20 and provides a means whereby the valve 19 may be lifted off of the seat 16. In the present instance the pipe 14 is relatively smaller in diameter than the diameter of the T 10 and in like manner the seat member 16 is smaller than the diameter of the T or cross bar portion 12, so that the pipe line P will normally furnish sufficient liquid in the chamber 17 and housing 10 to float the valve 19 while permitting the fluid to flow past the seat 16.

In the use and operation of this automatic cut-off means the pipe line P which may be provided with a manually operable valve V between the reservoir R and the cut-off housing 10 is adapted to receive the liquid from the reservoir R which liquid will flow into the T member 10 and about the collar 15. This liquid will float the valve 19, as the liquid rises in the sleeve 17 and the cap 18, and thereby move the valve 19 into released position. This released position of the valve 19 will be maintained as long as the pressure in the pipe line P is normal. When this pressure is less than normal the valve 19 will move into closed position on top of the seat 16. In this manner if the quantity of liquid in the reservoir R is below the open end of the pipe line P any air in the pipe line P will be prevented from passing through the valve seat and into the pipe 14.

While I have disclosed the cut-off means connected to a single reservoir I do not wish to be limited to this particular construction as this cut-off means can be connected to a plurality of reservoirs which are connected together by means of suitable pipe lines and this cut-off means will prevent the passage of air through the pipe line which is connected to this cut-off means and to the pump or other suction means.

It is, of course, understood that various changes and modifications may be made in the details of construction and design of the above specifically described embodiment of this invention without departing from the spirit thereof, such changes and modifications being restricted only by the scope of the following claims.

I claim:—

1. An automatic cut-off as set forth, comprising a T-shaped housing adapted to be connected to a source of liquid supply, the stem portion of said housing constituting the intake side thereof and one end of the cross bar portion of the housing constituting the outlet, a pipe of relatively small diameter extending through said outlet, means engaging said pipe and said housing to hold said pipe concentrically of the housing and to seal the pipe relative to the housing, a valve seat within the housing, means for mounting the valve seat in the housing, a sleeve secured to the other side of the cross bar portion of the housing, a cap secured to said sleeve, and a buoyant valve movable within said sleeve and said cap and adapted upon lowering of the liquid in the housing to a predetermined degree to engage said seat.

2. An automatic cut-off as set forth, comprising a T-shaped housing, the stem portion of the housing constituting the inlet and adapted to engage a pipe line connected to a source of liquid supply under pressure, one end of the cross bar portion of the housing constituting the outlet and being disposed lowermost, a pipe of relatively small diameter extending vertically into the housing through said outlet, a reducing nipple threaded into the housing and engaging said pipe to seal the pipe in the housing and to hold the pipe concentrically of the housing, a valve seat, a coupling member connecting the valve seat with the pipe, a sleeve threaded into the upper portion of the housing, a cap secured to said sleeve, a buoyant valve member movable within said sleeve and said cap and adapted upon lowering of the liquid level in the housing to a predetermined degree to engage on said seat, and valve releasing means extending through said cap and engaging said valve.

3. An automatic cut-off as set forth, comprising a housing having an intake port and an outlet port, a pipe extending into the housing, a valve seat secured to said pipe, a sleeve secured to the housing and extending upwardly from the seat, a cap secured to said sleeve, a gravity operated valve member in said housing, said valve member being of buoyant construction whereby it will float on the liquid within said housing and said cap when the liquid level within the housing is normal, a rod slidably carried by the cap, a flexible member secured at one end to said rod and at the other end to said valve, and a handle secured to the opposite end of said rod and disposed exteriorly of the cap whereby said valve member may be manually removed from said valve seat.

CHARLEY LOWERY.